(12) United States Patent
Yang et al.

(10) Patent No.: US 11,699,896 B2
(45) Date of Patent: Jul. 11, 2023

(54) CABLE PROCESSING SYSTEM

(71) Applicants: Tyco Electronics (Shanghai) Co. Ltd., Shanghai (CN); TE Connectivity Services GmbH, Schaffhausen (CH)

(72) Inventors: An Yang, Shanghai (CN); Lvhai Hu, Shanghai (CN); Roberto Francisco-Yi Lu, Bellevue, WA (US)

(73) Assignees: TE Connectivity Solutions GmbH, Schaffhausen (CH); Tyco Electronics (Shanghai) Co. Ltd., Shanghai (CN)

( * ) Notice: Subject to any disclaimer, the term of this patent is extended or adjusted under 35 U.S.C. 154(b) by 31 days.

(21) Appl. No.: 17/370,495

(22) Filed: Jul. 8, 2021

(65) Prior Publication Data

US 2022/0013999 A1    Jan. 13, 2022

(30) Foreign Application Priority Data

Jul. 9, 2020 (CN) .......................... 202010656850.2

(51) Int. Cl.
*H02G 1/12* (2006.01)
(52) U.S. Cl.
CPC ................................ *H02G 1/1265* (2013.01)
(58) Field of Classification Search
CPC .. H02G 1/1265; H02G 1/1263; H02G 1/1297; H02G 1/1273; H02G 1/12; H02G 1/292; H01B 13/0003; H01B 13/0036; B21F 1/02; B23D 15/02; B23D 33/02; B26D 3/00; B26D 5/086; H01R 43/28

USPC .......................................................... 83/870
See application file for complete search history.

(56) References Cited

U.S. PATENT DOCUMENTS

| 3,748,932 | A | * | 7/1973 | Neiman | H02G 1/1248 81/9.51 |
|---|---|---|---|---|---|
| 4,592,253 | A | * | 6/1986 | Hatfield | H02G 1/1295 81/9.41 |
| 4,628,599 | A | * | 12/1986 | Bermier, Jr. | H01B 7/0823 83/947 |

FOREIGN PATENT DOCUMENTS

| CN | 107359562 A | * | 11/2017 | ............... H02G 1/14 |
| DE | 19960158 C1 | * | 3/2001 | ............... H02G 1/14 |

* cited by examiner

*Primary Examiner* — Ghassem Alie
(74) *Attorney, Agent, or Firm* — Barley Snyder

(57) ABSTRACT

A cable processing system comprises a stripping device for stripping a segment of an outer cladding layer of a cable. The stripping device includes a support frame, and a mounting plate movably mounted on the support frame between a start position and an end position in the axial direction of the cable. The mounting plate includes a first surface and a second surface opposite to each other in an axial direction of the cable. A plurality of cutting units are mounted on the first surface of the mounting plate for cutting off the outer cladding layer in a circumferential direction of the cable. A plurality of stripping units are mounted on the second surface of the mounting plate for slicing the outer cladding layer in the axial direction.

20 Claims, 7 Drawing Sheets

CABLE PROCESSING SYSTEM

CROSS-REFERENCE TO RELATED APPLICATIONS

This application claims priority under 35 U.S.C. § 119 to Chinese Patent Application No. 202010656850.2, filed on Jul. 9, 2020, the entire disclosure of which is incorporated herein by reference.

FIELD OF THE INVENTION

The present disclosure relates to a cable processing system, and more specifically, to a cable processing system for stripping off a segment of an outer cladding layer of a cable.

BACKGROUND

In the related art, before a cable is connected to a connector, a segment of an outer cladding layer of the cable needs to be stripped to expose an inner conductor of the cable. Currently, however, cable stripping devices are only capable of stripping off segments of the outer cladding layer at the ends of the cable, and are unable to strip off segments of the outer cladding layer at a middle portion of the cable. Thus, these segments of the outer cladding layer can only be stripped manually, which reduces stripping efficiency, and increases costs.

SUMMARY

According to an embodiment of the present disclosure, a cable processing system comprises a stripping device for stripping a segment of an outer cladding layer of a cable located between two ends of the cable. The stripping device includes a support frame and a mounting plate movably mounted on the support frame between a start position and an end position in the axial direction of the cable. The mounting plate includes a first surface and a second surface opposite to each other in an axial direction of the cable. A plurality of cutting units are mounted on the first surface of the mounting plate for cutting off the outer cladding layer in a circumferential direction of the cable. A plurality of stripping units are mounted on the second surface of the mounting plate for slicing the outer cladding layer in the axial direction of the cable.

BRIEF DESCRIPTION OF THE DRAWINGS

The invention will now be described by way of example with reference to the accompanying Figures, of which.

DETAILED DESCRIPTION OF THE EMBODIMENTS

Figure 1:
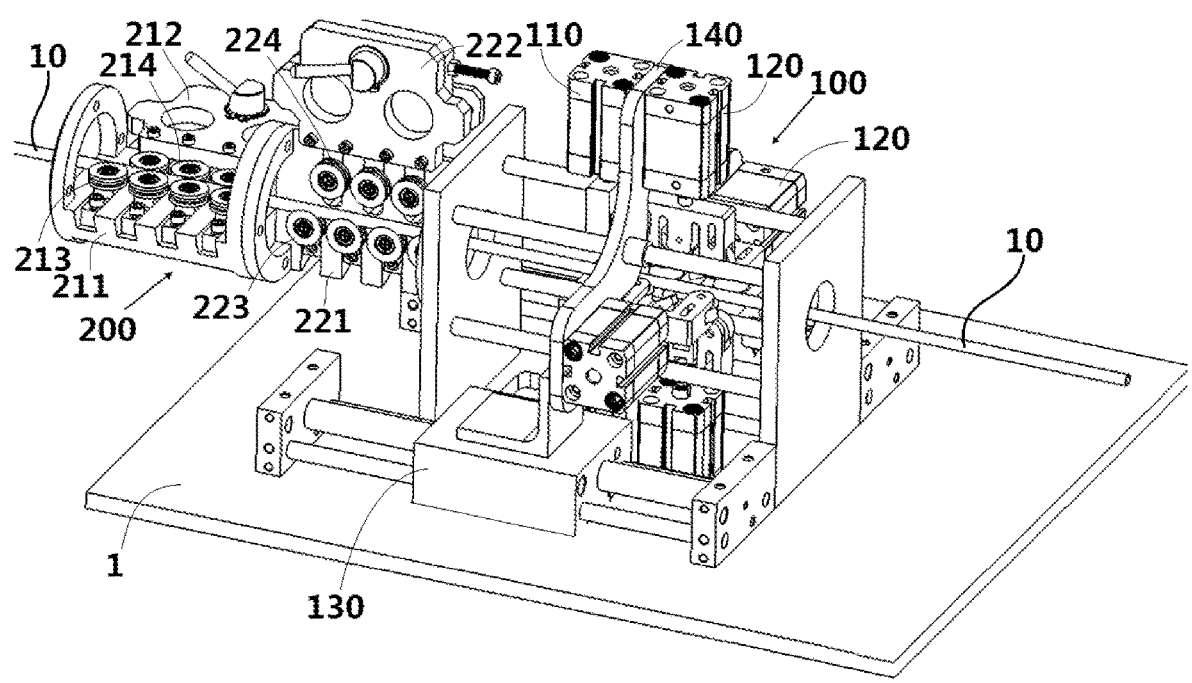
FIG. 1 shows a schematic perspective view of a cable processing system according to an exemplary embodiment of the disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a cable processing system comprises a stripping device for stripping a segment of an outer cladding layer on a cable. The stripping device includes a support frame and a mounting plate movably mounted on the support frame between a start position and an end position in the axial direction of the cable. The mounting plate includes a first surface and a second surface opposite to each other in an axial direction of the cable. A plurality of cutting units are symmetrically mounted on the first surface of the mounting plate and configured to cut off the outer cladding layer in a circumferential direction of the cable. A plurality of stripping units are symmetrically mounted on the second surface of the mounting plate and configured to slice the outer cladding layer in the axial direction. A segment of an outer cladding layer of the cable to be stripped by the stripping device is located at a middle part or segment between two ends of the cable.

According to one method of operation of the above stripping device, in a state where the mounting plate is positioned at the start position, the outer cladding layer is cut by the plurality of cutting units in the circumferential direction such that one end of the outer cladding layer segment to be stripped is cut off from the outer cladding layer of the cable. In response to the mounting plate moving from the start position to the end position, the outer cladding layer segment to be stripped is cut into a plurality of strips by the plurality of stripping units in the axial direction such that the outer cladding layer segment to be stripped is separated from an inner layer of the cable. Finally, in a state where the mounting plate is positioned at the end position, the outer cladding layer is cut off by the plurality of cutting units in the circumferential direction such that the other end of the outer cladding layer segment to be stripped is separated from the outer cladding layer of the cable.

FIG. 1 shows a schematic perspective view of a cable processing system according to an exemplary embodiment of the disclosure.

As shown in FIG. 1, in the illustrated embodiment, a cable processing system comprises a stripping device 100 configured to strip a segment of an outer cladding layer on a cable 10.

Figure 7:
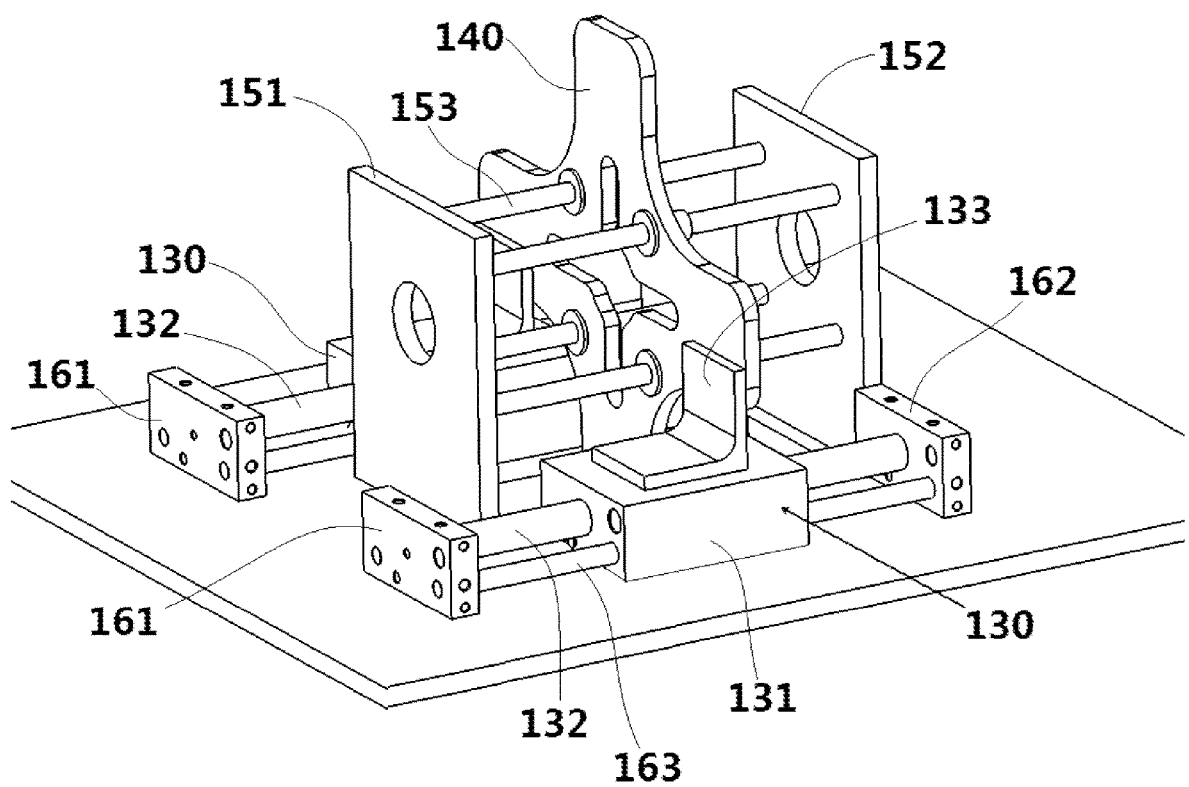
FIG. 7 shows a schematic perspective view of a support frame of the stripping device of the cable processing system shown in FIG. 1.

FIG. 7 shows a schematic perspective view of a support frame (151, 152, 153) of the stripping device of the cable processing system shown in FIG. 1.

As shown in FIGS. 1 and 7, in the illustrated embodiment, the stripping device 100 mainly comprises: a support frame (151, 152, 153); a mounting plate 140; a plurality of cutting units (110, 111, 112); and a plurality of stripping units (120, 121, 122, 123). The mounting plate 140 is movably mounted on the support frame (151, 152, 153) and has a first surface and a second surface opposite to each other in an axial direction of the cable 10. The plurality of cutting units (110, 111, 112) are symmetrically mounted on the first surface of the mounting plate 140 and configured to cut off the outer cladding layer in a circumferential direction of the cable 1. The plurality of stripping units (120, 121, 122, 123) are symmetrically mounted on the second surface of the mounting plate 140 and configured to slice the outer cladding layer in the axial direction.

As shown in FIGS. 1 and 7, in the illustrated embodiment, a segment of an outer cladding layer of the cable 10 to be stripped is located at a middle part between two ends of the cable 10, and the mounting plate 140 is movable between a start position (the left position in FIG. 1) and an end position (the right position in FIG. 1) in the axial direction of the cable 10.

As shown in FIGS. 1 and 7, in the illustrated embodiment, when the mounting plate 140 is positioned at the start position, the outer cladding layer is cut by the plurality of cutting units (110, 111, 112) in the circumferential direction, so that one end of the outer cladding layer segment to be stripped is cut off and separated from the outer cladding layer of the cable 10.

As shown in FIGS. 1 and 7, in the illustrated embodiment, when the mounting plate 140 moves from the start position to the end position, the outer cladding layer segment to be stripped is cut into a plurality of strips by the plurality of stripping units (120, 121, 122, 123) in the axial direction, so that the outer cladding layer segment to be stripped is separated from an inner layer of the cable 10.

As shown in FIGS. 1 and 7, in the illustrated embodiment, when the mounting plate 140 is positioned at the end position, the outer cladding layer is cut off by the plurality of cutting units (110, 111, 112) in the circumferential direction, such that the other end of the outer cladding layer segment to be stripped is separated from the outer cladding layer of the cable 10. In this way, the outer cladding layer segment of the cable 10 can be cut into the plurality of strips and separated from the cable 10 automatically.

Figure 2:
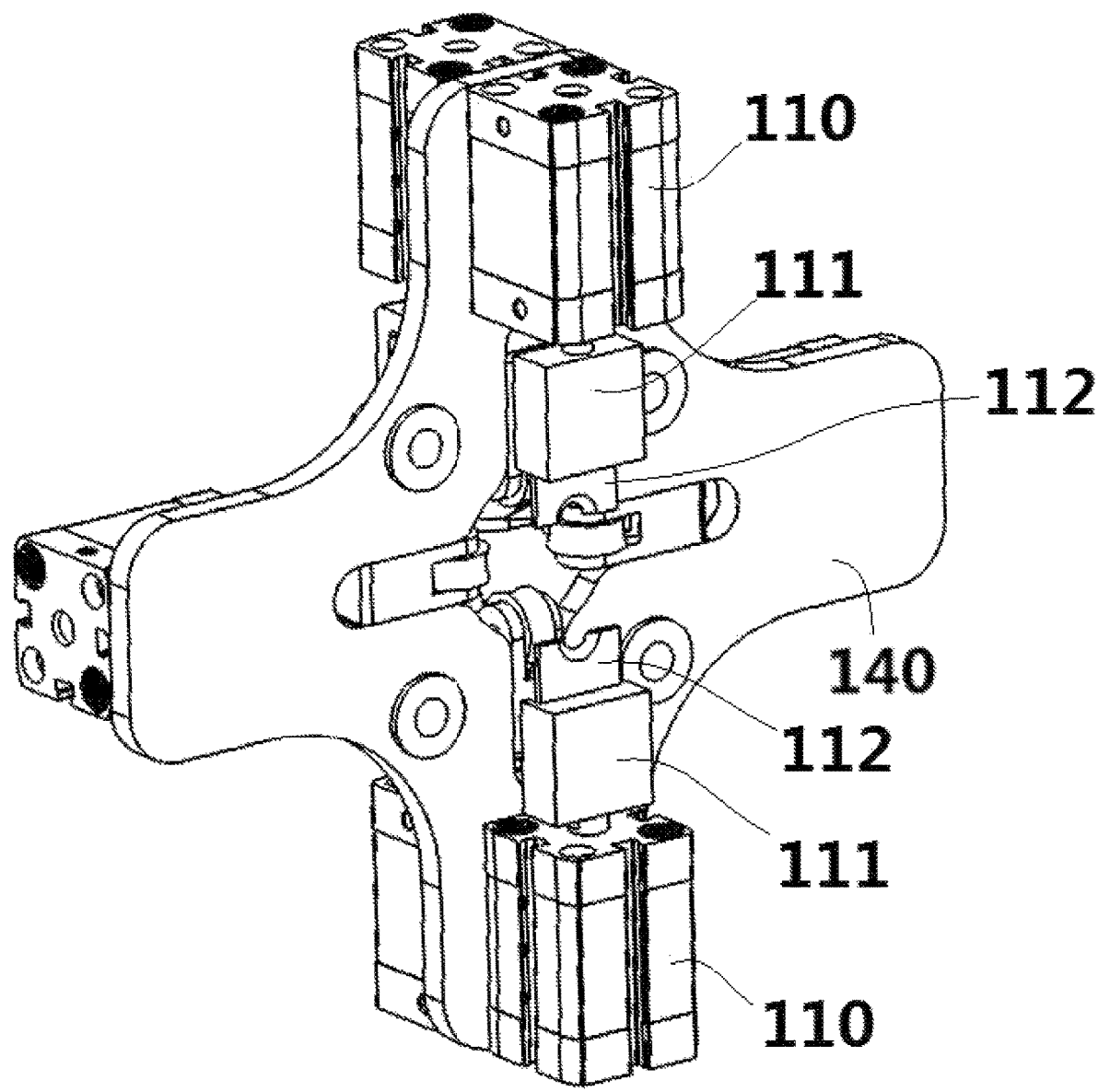
FIG. 2 shows a schematic perspective view of a stripping device of the cable processing system shown in FIG. 1 when viewed from one side.
Figure 3:
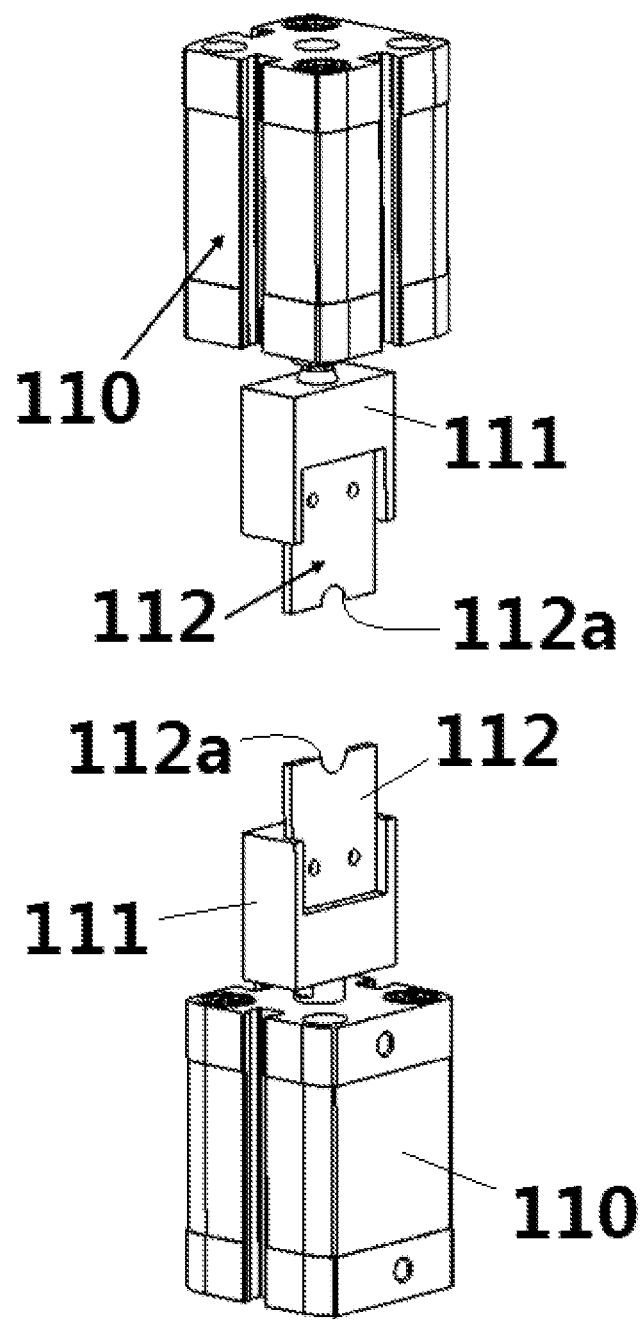
FIG. 3 shows a schematic perspective view of cutting units of the stripping device of the cable processing system shown in FIG. 2.

FIG. 2 shows a schematic perspective view of a stripping device 100 of the cable processing system shown in FIG. 1 when viewed from one side. FIG. 3 shows a schematic perspective view of cutting units (110, 111, 112) of the stripping device 100 of the cable processing system shown in FIG. 2.

As shown in FIGS. 1 to 3 and 7, in the illustrated embodiment, the plurality of cutting units (110, 111, 112) may include two cutting units arranged opposite to each other in a radial direction of the cable 10.

As shown in FIGS. 1 to 3 and 7, in the illustrated embodiment, each of the cutting units (110, 111, 112) includes a first cutter 112 formed with a concave semicircular cutting edge 112a for cutting the outer cladding layer.

As shown in FIGS. 1 to 3 and 7, in the illustrated embodiment, each of the cutting units (110, 111, 112) further includes a first driver 110 configured to drive the first cutter 112 to move in the radial direction of the cable 10.

As shown in FIGS. 1 to 3 and 7, in the illustrated embodiment, each of the cutting units (110, 111, 112) further includes a first cutter holder 111 connected onto the first driver 110. The first cutter 112 is detachably mounted on the first cutter holder 111.

As shown in FIGS. 1 to 3 and 7, in the illustrated embodiment, the first driver 110 may be an air cylinder or a hydraulic cylinder including a first cylinder body and a first piston rod. The first cylinder body is fixed on the first surface of the mounting plate 140, and the first piston rod is connected onto the first cutter holder 111. However, the disclosure is not limited to the illustrated embodiment, and the first driver 110 may also be other types of linear driving devices such as an electric cylinder.

As shown in FIGS. 1 to 3 and 7, in the illustrated embodiment, the semicircular cutting edge 112a of the first cutter 112 has a radius equal to an inner diameter of the outer cladding layer of the cable 10, such that only the outer cladding layer of the cable 10 can be cut by the first cutter 112, avoiding the inner layer of the cable 10 beneath the outer cladding layer from being cut.

As shown in FIGS. 1 to 3 and 7, in the illustrated embodiment, the first surface of the mounting plate 140 is perpendicular to an axis of the cable 10, and the two cutting units (110, 111, 112) mounted on the first surface of the mounting plate 140 are arranged opposite to each other in a vertical direction perpendicular to the axis of the cable 10.

Figure 4:
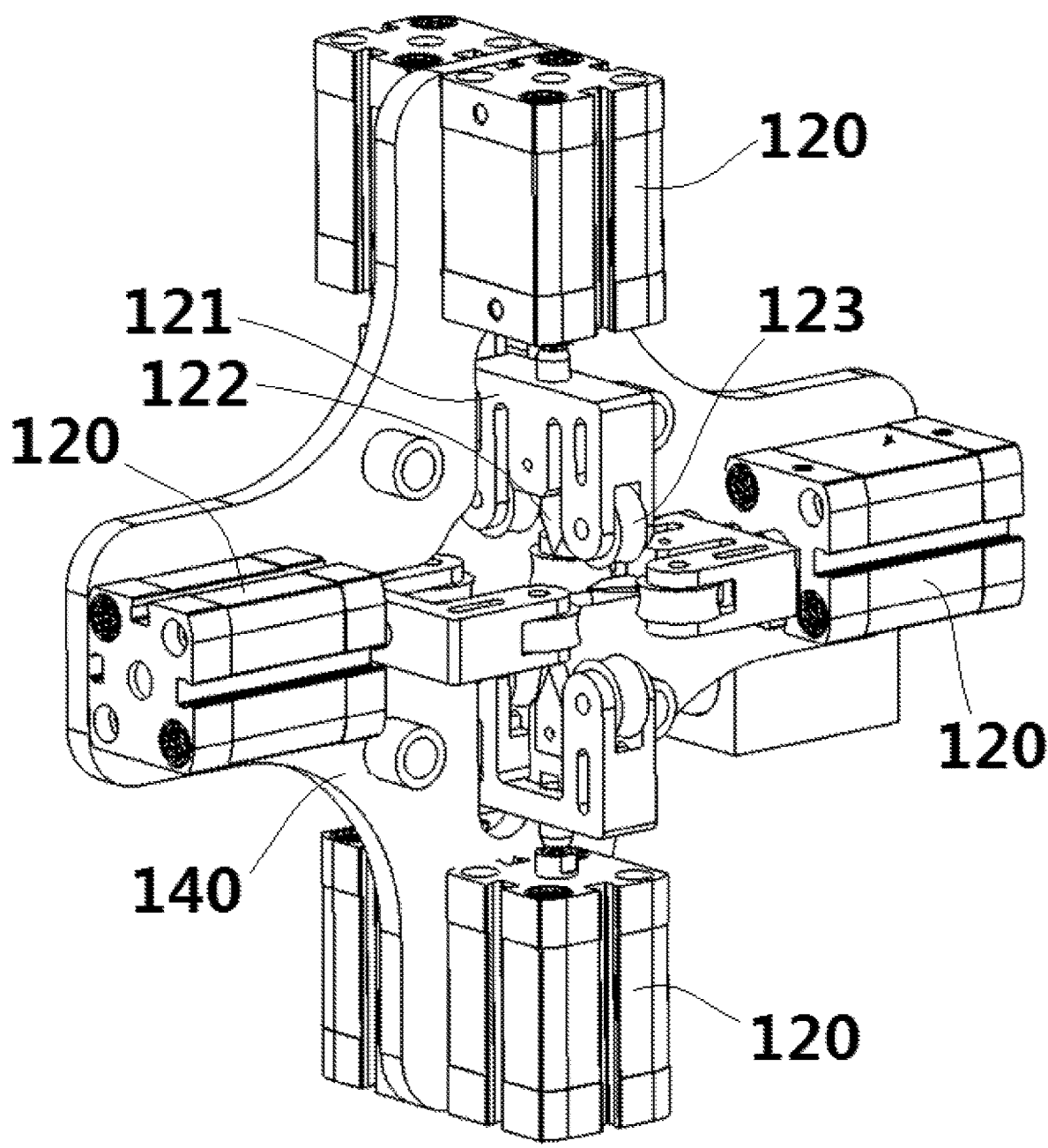
FIG. 4 shows a schematic perspective view of the stripping device of the cable processing system shown in FIG. 2 when viewed from another side.
Figure 5:
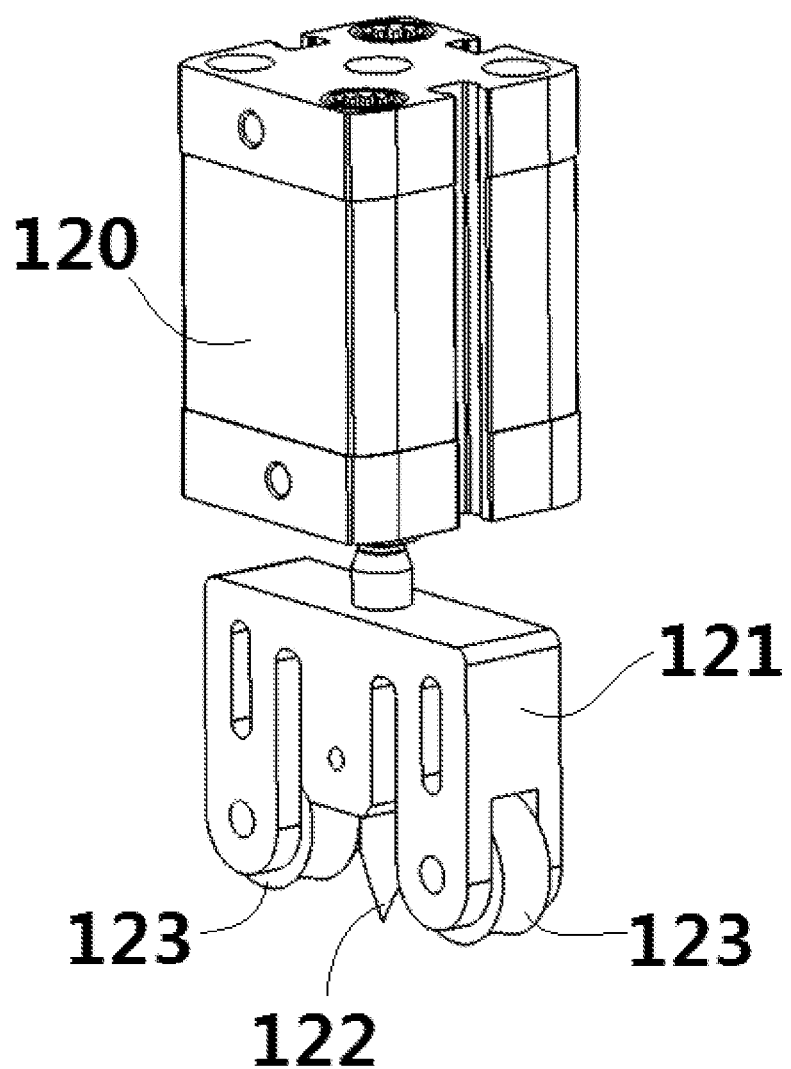
FIG. 5 shows a schematic perspective view of stripping units of the stripping device of the cable processing system shown in FIG. 4.
Figure 6:
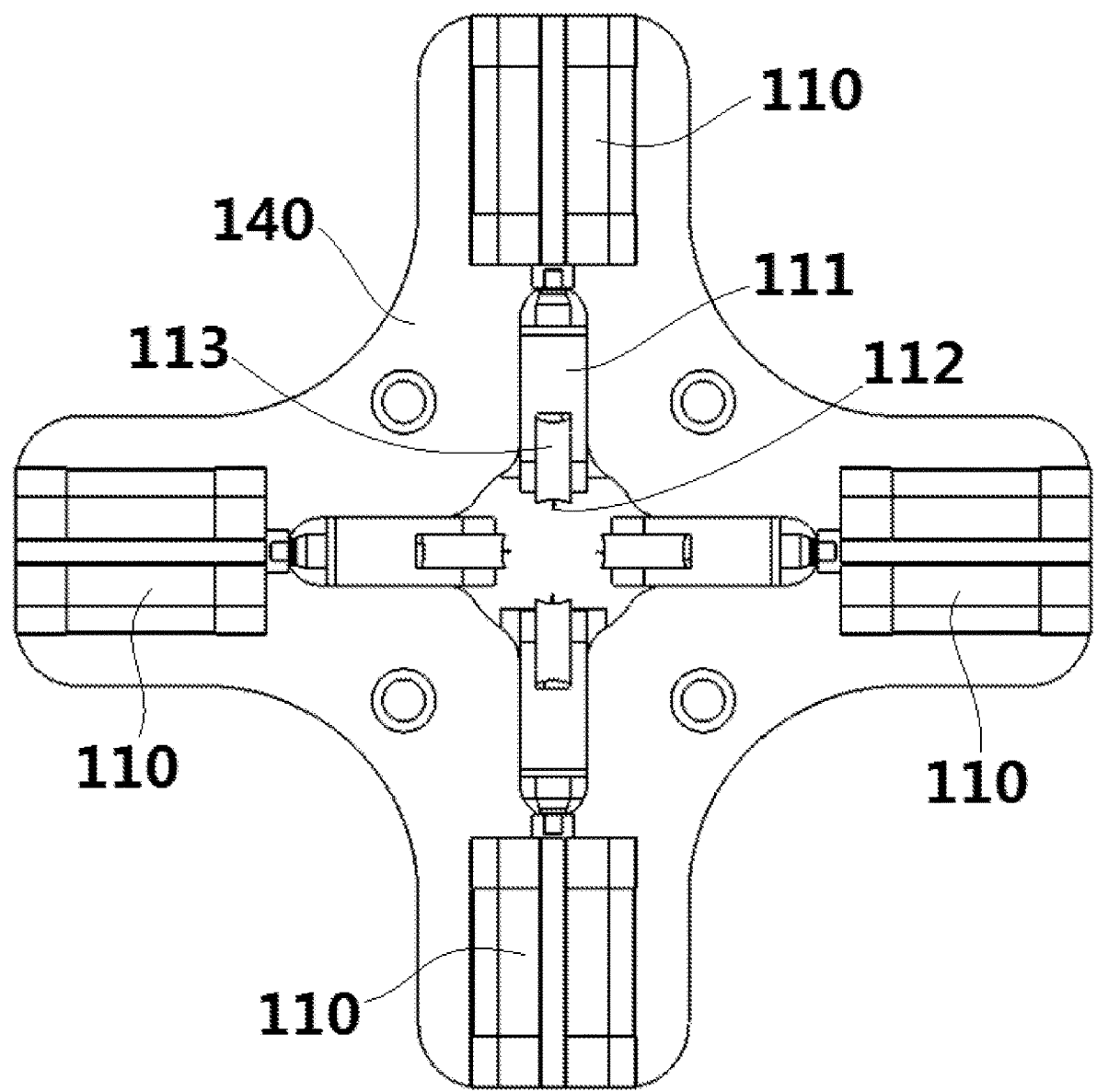
FIG. 6 shows a schematic plan view of the stripping device of the cable processing system shown in FIG. 2 when viewed from a top side.

FIG. 4 shows a schematic perspective view of the stripping device 100 of the cable processing system shown in FIG. 2 when viewed from another side. FIG. 5 shows a schematic perspective view of the stripping units (120, 121, 122, 123) of the stripping device 100 of the cable processing system shown in FIG. 4. FIG. 6 shows a schematic plan view of the stripping device 100 of the cable processing system shown in FIG. 2 when viewed from a top side.

As shown in FIGS. 1 to 7, in the illustrated embodiment, the plurality of stripping units (120, 121, 122, 123) may include four stripping units arranged to be evenly spaced apart from each other around the axis of the cable 10.

As shown in FIGS. 1 to 7, in the illustrated embodiment, each of the stripping units (120, 121, 122, 123) includes a second cutter 122 formed with a straight cutting edge extending in the axial direction of the cable 10.

As shown in FIGS. 1 to 7, in the illustrated embodiment, each of the stripping units 120, 121, 122, 123 further includes a second driver 120 configured to drive the second cutter 122 to move in the radial direction of the cable 10.

As shown in FIGS. 1 to 7, in the illustrated embodiment, each of the stripping units (120, 121, 122, 123) further includes a second cutter holder 121 connected to the second driver 120. The second cutter 122 is detachably mounted on the second cutter holder 121.

As shown in FIGS. 1 to 7, in the illustrated embodiment, each of the stripping units (120, 121, 122, 123) further includes two rollers 123 rotatably mounted on the second cutter holder 121. Further, the two rollers 123 are symmetrically mounted on a front side and a rear side of the second cutter 122. Furthermore, each of the rollers has a concave arc contact surface for pressing against the outer cladding layer of the cable 10.

As shown in FIGS. 1 to 7, in the illustrated embodiment, the second driver 120 may be an air cylinder or a hydraulic cylinder including a second cylinder body and a second piston rod. The second cylinder body is fixed on the second surface of the mounting plate 140, and the second piston rod is connected onto the second cutter holder 121. However, the disclosure is not limited to the illustrated embodiment, and the second driver 120 may also be other types of linear drive devices such as an electric cylinder.

As shown in FIGS. 1 to 7, in the illustrated embodiment, the second surface of the mounting plate 140 is perpendicular to the axis of the cable 10, and one pair of stripping units of the four stripping units (120, 121, 122, 123) mounted on the second surface of the mounting plate 140 are arranged opposite to each other in a vertical direction perpendicular to the axis of the cable 10, and the other pair of stripping units are arranged opposite to each other in a horizontal direction perpendicular to the axis of the cable 10.

As shown in FIGS. 1 to 7, in the illustrated embodiment, the support frame (151, 152, 153) includes a first vertical support plate 151 and a second vertical support plate 152 that are arranged opposite to each other in the axial direction of the cable 10. The support frame (151, 152, 153) further includes a plurality of first guide rods 153 connected between the first vertical support plate 151 and the second vertical support plate 152. The plurality of first guide rods 153 extend in the axial direction of the cable 10 and pass through the mounting plate 140, such that the mounting plate 140 is movable along the first guide rods 153.

As shown in FIGS. 1 to 7, in the illustrated embodiment, the cable processing system further includes two third drivers 130 that are symmetrically arranged on two opposite sides of the mounting plate 140 in the radial direction of the cable 10. The two third drivers 130 are configured to drive the mounting plate 140 to move between the start position and the end position in the axial direction of the cable 10.

As shown in FIGS. 1 to 7, in the illustrated embodiment, each of the third drivers 130 may be an air cylinder or a hydraulic cylinder including a third cylinder body 131 and a third piston rod 132. The third cylinder 131 is connected to the mounting plate 140 by a right-angle connection piece 133. The cable processing system also includes a first fixed plate 161 and a second fixed plate 162. Two ends of the third piston rod 132 are connected to the first fixed plate 161 and the second fixed plate 162 respectively, such that the third cylinder 131 can move upwardly in the axial direction of the cable 10. However, the disclosure is not limited to the illustrated embodiment, and the third driver 130 may also be other types of linear drive devices such as an electric cylinder.

As shown in FIGS. 1 to 7, in the illustrated embodiment, the cable processing system further includes a second guide rod 163, two ends of which are connected onto the first fixed plate 161 and the second fixed plate 162 respectively. The second guide rod 163 extends in the axial direction of the cable 10 and passes through the third cylinder 131 to guide the third cylinder 131 to move along the second guide rod 163.

As shown in FIGS. 1 to 7, in the illustrated embodiment, the cable processing system further includes a base 1 on which the first vertical support plate 151, the second vertical support plate 152, the first fixed plate 161 and the second fixed plate 162 are fixed.

As shown in FIGS. 1 to 7, in the illustrated embodiment, the cable processing system further includes a straightening device 200 configured to straighten the cable 10 before the outer cladding segment is stripped.

As shown in FIGS. 1 to 7, in the illustrated embodiment, the straightening device 200 includes a horizontal fixed bracket 211, a horizontal movable bracket 212 arranged opposite to the horizontal fixed bracket 211, a row of first rollers 213 rotatably mounted on the horizontal fixed bracket 211 and arranged in a row in the axial direction of the cable 10, and a row of second rollers 214 rotatably mounted on the horizontal movable bracket 212 and arranged in a row in the axial direction of the cable 10. Each of the first rollers 213 and the second rollers 214 has a rotation axis extending in the vertical direction, and a concave arc surface in contact with the outer cladding layer of the cable 10. The horizontal movable bracket 212 is movable horizontally in the radial direction of the cable 10 such that the cable 10 is clamped between the row of first rollers 213 and the row of second rollers 214.

As shown in FIGS. 1 to 7, in the illustrated embodiment, the straightening device 200 further includes a vertical fixed bracket 221, a vertical movable bracket 222 arranged opposite to the vertical fixed bracket 221, a row of third rollers 223 rotatably mounted on the vertical fixed bracket 221 and arranged in a row in the axial direction of the cable 10, and a row of fourth rollers 224 rotatably mounted on the vertical movable bracket 222 and arranged in a row in the axial direction of the cable 10. Each of the third rollers 223 and the fourth roller 224 has a rotation axis extending in the horizontal direction perpendicular to the axis of the cable 10, and a concave arc surface in contact with the outer cladding layer of the cable 10. The horizontal movable bracket 222 is movable vertically in the radial direction of the cable 10, such that the cable 10 is clamped between the row of third rollers 213 and the row of fourth rollers 214.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable processing system comprising:
   a stripping device for stripping a segment of an outer cladding layer between two ends of a cable, including:
      a support frame;
      a mounting plate movably mounted on the support frame between a start position and an end position in the axial direction of the cable and having a first surface and a second surface opposite to each other in an axial direction of the cable;
      a plurality of cutting units mounted on the first surface of the mounting plate for cutting off the outer cladding layer in a circumferential direction of the cable, each of the cutting units including a first driver driving a first cutter to move in a radial direction of the cable, the first driver comprising a linear driving device having a fixed member attached to the mounting plate and a movable member movable relative to the fixed member along an axis extending in the radial direction of the cable; and a plurality of stripping units mounted on the second surface of the mounting plate for slicing the outer cladding layer in the axial direction.

2. The cable processing system according to claim 1, wherein the plurality of cutting units are symmetrically mounted on the first surface of the mounting plate, and the plurality of stripping units are symmetrically mounted on the second surface of the mounting plate.

3. The cable processing system according to claim 1, wherein the plurality of cutting units include two cutting units arranged opposite each other in a radial direction of the cable.

4. The cable processing system according to claim 3, wherein each of the first cutters is formed with a concave semicircular cutting edge for cutting the outer cladding layer.

5. The cable processing system according to claim 4, wherein the semicircular cutting edge of the first cutter has a radius equal to an inner diameter of the outer cladding layer of the cable such that the first cutter cuts the outer cladding layer of the cable without cutting the inner layer of the cable beneath the outer cladding layer cut.

6. The cable processing system according to claim 1, wherein each of the cutting units further includes a first cutter holder connected to the first driver, the first cutter being detachably mounted on the first cutter holder.

7. The cable processing system according to claim 1, wherein the plurality of stripping units include four stripping units evenly spaced apart from each other around the axis of the cable.

8. The cable processing system according to claim 7, wherein each of the stripping units includes a second cutter formed with a straight cutting edge extending in the axial direction of the cable.

9. The cable processing system according to claim 8, wherein each of the stripping units further includes a second driver configured to drive the second cutter to move in a radial direction of the cable.

10. The cable processing system according to claim 9, wherein each of the stripping units further includes a second cutter holder connected to the second driver, the second cutter being detachably mounted on the second cutter holder.

11. The cable processing system according to claim 10, wherein each of the stripping units further includes two rollers rotatably mounted on the second cutter holder, the two rollers being symmetrically mounted on a front side and a rear side of the second cutter, each of the rollers having a concave arc contact surface to be pressed against the outer cladding layer of the cable.

12. The cable processing system according to claim 10, wherein the second driver includes an air cylinder or a hydraulic cylinder having a second cylinder body and a second piston rod, the second cylinder body fixed on the second surface of the mounting plate and the second piston rod connected onto the second cutter holder.

13. The cable processing system according to claim 1, wherein the support frame includes a first vertical support plate and a second vertical support plate arranged opposite to each other in the axial direction of the cable, and a plurality of first guide rods connected between the first vertical support plate and the second vertical support plate, the plurality of first guide rods extend in the axial direction of the cable and pass through the mounting plate such that the mounting plate is movable along the first guide rods.

14. The cable processing system according to claim 13, further comprising two third drivers arranged on two opposite sides of the mounting plate in the radial direction of the cable, the two third drivers driving the mounting plate to move between the start position and the end position in the axial direction of the cable.

15. The cable processing system according to claim 14, wherein each of the third drivers includes an air cylinder or a hydraulic cylinder having a third cylinder body and a third piston rod, the third cylinder being connected to the mounting plate by a right-angle connection piece, the cable processing system further including a first fixed plate and a second fixed plate, two ends of the third piston rod are connected to the first fixed plate and the second fixed plate respectively such that the third cylinder is movable upwardly in the axial direction of the cable.

16. The cable processing system according to claim 15, further comprising a second guide rod having two ends connected to the first fixed plate and the second fixed plate respectively, the second guide rod extending in the axial direction of the cable and passing through the third cylinder to guide the third cylinder to move along the second guide rod.

17. The cable processing system according to claim 1, further comprising a straightening device for straightening the cable before the outer cladding segment is stripped.

18. The cable processing system according to claim 17, wherein the straightening device includes:

a horizontal fixed bracket;

a horizontal movable bracket arranged opposite to the horizontal fixed bracket;

a row of first rollers rotatably mounted on the horizontal fixed bracket and arranged in a row in the axial direction of the cable; and a row of second rollers rotatably mounted on the horizontal movable bracket and arranged in a row in the axial direction of the cable, each of the first rollers and the second rollers has a rotation axis extending in a vertical direction and a concave arc surfaces in contact with the outer cladding layer of the cable, the horizontal movable bracket is movable horizontally in a radial direction of the cable such that the cable is clamped between the row of first rollers and the row of second rollers.

19. The cable processing system according to claim 18, wherein the straightening device further includes:

a vertical fixed bracket;

a vertical movable bracket arranged opposite to the vertical fixed bracket;

a row of third rollers rotatably mounted on the vertical fixed bracket and arranged in a row in the axial direction of the cable; and a row of fourth rollers rotatably mounted on the vertical movable bracket and arranged in a row in the axial direction of the cable, each of the third rollers and the fourth roller has a rotation axis extending in a horizontal direction perpendicular to the axis of the cable and a concave arc surfaces in contact with the outer cladding layer of the cable, the horizontal movable bracket is movable vertically in the radial direction of the cable such that the cable is clamped between the row of third rollers and the row of fourth rollers.

20. The cable processing system according to claim 1, wherein the first and second surfaces of the mounting plate are parallel to one another and perpendicular to the axial direction of the cable, the movable member of the first linear driving device comprising a movable cylinder of a linear actuator and driving the first cutter to move in a direction parallel to the first surface of the mounting plate.

\* \* \* \* \*